March 2, 1965 C. E. PAYNE ETAL 3,172,041

REMOTE CONTROL SYSTEM FOR TELEVISION RECEIVER

Filed Feb. 3, 1961

*INVENTORS*
CHARLES E. PAYNE
ROBERT E. PROUTY
*BY*
Robert D. Sommer
AGENT

United States Patent Office 3,172,041

Patented Mar. 2, 1965

3,172,041

REMOTE CONTROL SYSTEM FOR TELEVISION RECEIVER

Charles E. Payne and Robert E. Prouty, Logansport, Ind., assignors to Essex Wire Corporation Filed Feb. 3, 1961, Ser. No. 87,019
2 Claims. (Cl. 325—391)

Figure 1:
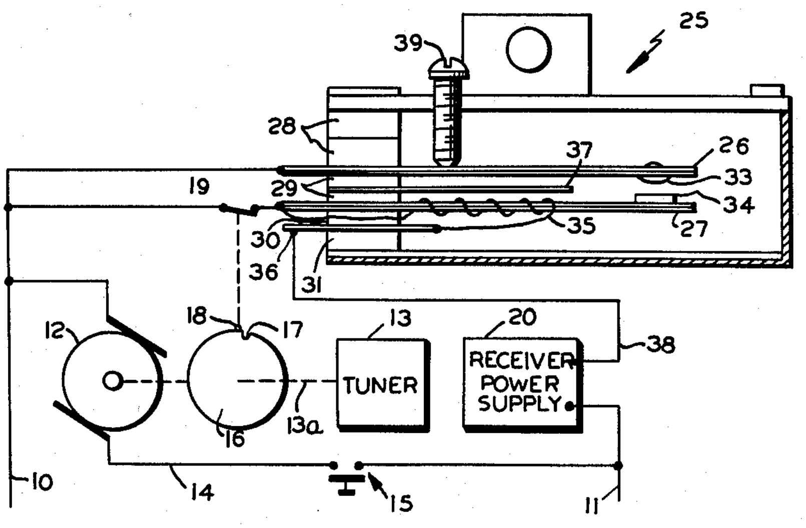

This invention relates to a remote control system for a television receiver having an electric motor which drives the channel selector means of a tuner and particularly to such a system in which the electric motor additionally operates switch means for energizing and de-energizing the receiver.

In some television receivers, the tuner for selecting predetermined frequency channels is driven by an electric motor. With this type of receiver, it is common to provide for remote control of the motor-driven tuner by means of a control unit having either a wired connection to the receiver or a wireless transmission connection employing radio, acoustic or light signals. In one such type of receiver, the motor drives the tuner shaft in a step-by-step manner through each of the consecutive tuner positions, or if desired, to only selected positions in response to electric impulse signals. To simplify the control means for such a receiver system, it has been proposed to employ a switch connected to the receiver power supply which is opened in a selected position of the tuner shaft. Thus, the control means for the tuner may be used to also turn the receiver off and on. However, this arrangement has the disadvantage that the receiver power supply is momentarily de-energized in shifting the tuner between certain positions.

One object of the present invention is to provide a relatively simple and inexpensive means for preventing such momentary de-energization of the receiver power supply.

Another object of the present invention is to provide means of the foregoing character employing thermally responsive means which provides for substantially immediate energization of the receiver power supply when operation of the receiver is desired and which provides for de-energization of the receiver power supply in a predetermined, brief time period after it is desired to turn off the receiver.

Accordingly, the invention is directed to a control system for a television receiver employing a tuner driven by a step-by-step motor device in response to electrical impulse signals. In accordance with the invention, there is provided a thermally responsive switch having two individually heated thermomotive members. The means for heating a first one of the thermomotive members is connected in a first circuit consisting of the receiver power supply and a switch operated by the motor device. The means for heating the second thermomotive member has a substantial resistance value and is connected in a second circuit shunting the motor-operated switch and including normally open contacts operated by the thermomotive members. The first thermomotive member is operative when heated in response to closing of the motor-operated switch to close the normally open contacts, thereby completing the second circuit. The second thermomotive member is operative when heated in response to opening of the motor-operated switch for a predetermined time period to reopen the contacts. The resistance of the heating means for the second thermomotive member is sufficiently great to limit the current passing therethrough to a value insufficient to generate enough heat to cause movement of the second thermomagnetic member to a contact-opening position, while the motor-operated switch remains closed.

Figure 2:
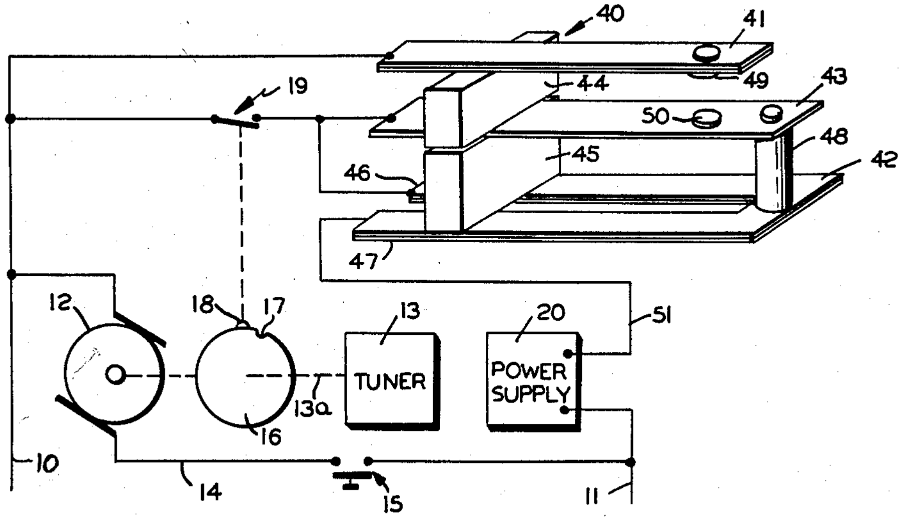

For a better understanding of the invention, reference is made to the accompanying drawing, in which:

FIG. 1 is a schematic circuit diagram showing one embodiment of the invention; and FIG. 2 is a schematic circuit diagram showing a second embodiment of the invention.

Referring first to both figures of the drawing, main power lines 10 and 11 provide a source of power. A step-by-step motor device 12 coupled to the shaft 13*a* of the tuner 13 of a television receiver is connected at one side directly to the line 10 and is connected by a line 14 through a normally open motor-energizing switch 15 to the line 11. The motor device 12 may be an electromagnetically operated ratchet device rotating a shaft in a step-by-step manner between a series of successive positions upon successive energizations or the motor device 12 may comprise a motor and associated switching unit of the type disclosed in U.S. Patent No. 2,868,967, of R. Poppa and J. L. Hoellerich, issued January 13, 1959. For the purpose of understanding the present invention, it is sufficient to point out that the motor device 12 will upon each successive energization resulting from closing of switch 15 shift the tuner 13 to the next of a series of preselected positions. That is, the tuner 13 is driven by the motor device 12 through each of its consecutive positions and is stopped at either all positions or at only certain preselected positions. The motor-energizing switch 15 may be a manually operated switch located at a remote point from the receiver or may be a relay-switch located at the receiver and controlled by a suitable remote control device.

The motor device 12 also rotates a cam 16 having a depressed portion 17. Riding upon the cam 16 is a follower 18 having a mechanical connection with a normally closed cam switch 19 which is opened whenever the cam follower 18 drops into the depressed portion 17 of cam 16. Depressed portion 17 is arranged on cam 16 to correspond to a particular tuner position not used to receive a television signal. That is, the particular tuner position may be one where normally no station can be received, or it may be an extra position provided in addition to the usual tuner positions. Cam switch 19 is employed to de-energize the receiver power supply 20 whenever the tuner 13 is shifted to the one particular "off" position. It will be apparent that if the power supply 20 were simply connected in series with switch 19 without any additional control means, the power supply 20 would be de-energized each time the tuner 13 passed through this "off" position.

In accordance with an aspect of this invention, thermally responsive switch means are employed to shunt cam switch 19 whenever operation of the receiver is desired while cam switch 19 is momentarily open and to permit de-energization within a brief predetermined time period after the tuner is shifted to the "off" position. Referring now particularly to FIG. 1, the thermally responsive switch means comprise a thermal relay designated by the reference numberal 25. The thermal relay 25 has a pair of thermomotive members 26 and 27 supported at one end between insulators 28, 29, 30 and 31. The thermomotive members 26 and 27 are preferably bimetallic strips of substantially equal length arranged to move in the same direction with changes in ambient temperature. The thermomotive members 26 and 27 carry respectively contacts 33 and 34 which are normally separated from each other. A heater coil 35 upon thermomotive member 27 is connected between the stationary end of member 27 and a terminal 36. Thermomotive member 26 is constructed to have a substantial resistance value so as to be self-heating upon an appreciable current flow therethrough. A heat baffle 37 is disposed between members 26 and 27 to shield member 26 from heat generated by heater coil 35 and to shield member 27 from heat generated by current flow through member 26.

One end of the heater coil 35 is connected to power line 10 through the cam switch 19. The other end of the heater coil 35 is connected at terminal 36 to one terminal of the receiver power supply 20 by line 38, the other terminal of the power supply 20 being connected to the supply line 11. Thermomotive member 26 is connected to supply line 10 and thermomotive member 27 is connected to one side of cam switch 19, thereby providing a circuit shunting cam switch 19 whenever contacts 33 and 34 engage.

The parts of the thermal relay 25 are normally in the positions illustrated in FIG. 1 after the receiver has been turned off by causing cam 16 to be rotated to a position where the cam follower 18 drops in depressed portion 17 to open cam switch 19. When switch 15 is closed to initiate operation of the receiver, the motor device 12 is energized and rotates the tuner 13 and the cam 16 from the "off" position. This rotation of cam 16 raises the cam follower 18 out of the depressed portion 17 and causes cam switch 19 to close. This action completes a circuit through the receiver power supply 20 and the heater coil 35. The heat generated by current flow through heater coil 35 causes thermomotive member 27 to move toward thermomotive member 26 to close contacts 33 and 34. The closing of contacts 33 and 34 closes a second circuit shunting cam switch 19 but because of the high resistance of member 26 very little current will flow in this circuit while cam switch 19 remains closed.

If by successive movements of the motor device 12 through its positions the cam 16 returns to the "off" position, and cam switch 19 reopens, the entire current of the receiver power supply 20 passes through the contacts 33 and 34 and the member 26. Unless switch 19 is reclosed promptly by further rotation of the motor device 12 to another tuner position, the heat generated by the passage of current through member 26 will cause the latter to move away from member 27 thereby separating contacts 33 and 34 to interrupt the circuit to the power supply 20. With no current flow, both members 26 and 27 will cool and return to their normal positions illustrated in FIG. 1 with contacts 33 and 34 remaining separated. The period of time for which it is desired that contacts 33 and 34 remain engaged after opening of cam switch 19 can be adjusted to any suitable value by means of adjusting screw 39.

FIG. 2 of the drawing shows a modification of the control system of FIG. 1 which utilizes a thermally responsive switch means of the type disclosed in the copending United States application of J. J. Smith, R. E. Prouty and J. A. Keirans, Serial No. 762,799, filed September 23, 1958, now United States Patent 2,984,722, and assigned to the assignee of the present application. The thermally responsive switch means shown comprises a thermal relay designated by the reference numeral 40 and illustrated somewhat schematically in the drawing. The thermal relay comprises two thermomotive members 41 and 42, preferably of thermostatic bimetal material, and a flexible member 43 of sheet metal disposed between the members 41 and 42. The members 41, 42, 43 are secured in spaced relation upon insulator blocks 44 and 45. Member 42 is of a U shape with two terminal ends 46 and 47 at one end. At the other end, member 42 carries an insulation member 48 which transmits motion of the member 42 to the member 43. A first electrical contact 49 is attached to member 41 near the free end thereof and a second electrical contact 50 is attached to member 43 for cooperation with contact 49. Both members 41 and 42 are arranged to move in the same direction with changes in ambient temperature so that the contacts 49 and 50 normally remain separated. Both members 41, 42 have suitable resistance values so as to be self-heating upon the passage of current therethrough. It will be noted that member 43 serves to shield the members 41 and 42 from heat generated in each other.

Terminal end 46 of member 42 is connected to supply line 10 through cam switch 19 and the other terminal end 47 is connected by line 51 to one terminal of power supply 20, the other terminal being connected to supply line 11. Member 41 is connected to supply line 10 and member 43 is connected to one side of cam switch 19 in a circuit shunting switch 19 whenever contacts 49 and 50 are closed.

The control system of FIG. 2 operates in a manner similar to that described with regard to FIG. 1. With the motor device 12 in the "off" position where cam switch 19 is open and the parts of the thermal relay 40 are in the positions illustrated in FIG. 2, the first closing of switch 15 will cause the motor device 12 to rotate cam 16 to a position where cam switch 19 closes. This completes a circuit through the legs of member 42 and the power supply 20 and the heat generated by current flow through member 42 causes member 42 to move toward member 41. This motion is transmitted by insulation member 48 to member 43 which carries the contact 50 into engagement with contact 49 in a short time after cam switch 19 closes. This action completes a shunt circuit across cam switch 19 through members 41, 43 and contacts 49, 50. However, because of the resistance of member 41 very little current passes through this shunt circuit.

When the motor device 12 returns the cam 16 to the "off" position and cam switch 19 opens, the entire current of the receiver power supply passes through member 41. The heat generated by the passage of current through member 41 will cause the latter to move away from member 43 and separate contacts 49 and 50 in a predetermined period of time unless cam switch 19 is reclosed meanwhile. After the contacts 49 and 50 separate, members 41 and 42 will cool and return with member 43 to their original positions.

While the invention has been illustrated and described in preferred forms, it should be understood that various changes and modifications can be made without departing from the scope of the invention as claimed.

We claim:

1. In a remote control system for a television receiver having a power supply, a driven selector element with a shaft arranged to be driven step-by-step through a predetermined plurality of circumferentially spaced consecutive positions by an electric motor device upon each successive energization of said motor device, and means for connecting said motor device to an electrical power source including a control switch operable in response to a remote control action to cause energization of said motor device, the improvement comprising:

(a) a high resistance current path and a low resistance current path connected in parallel for energizing said receiver power supply from said power source;

(b) a normally closed switch means in said low resistance current path operable by said motor device to interrupt said low resistance current path when said shaft is at a particular one of said spaced positions;

(c) first and second normally separated switch contacts in said high resistance current path;

(d) first current flow responsive means connected to said receiver power supply and operable in response to energization of said power supply to move said first contact to a position where the latter engages said second contact;

(e) second current flow responsive means in said high resistance current path operable in response to a current flow therethrough of the entire current of said receiver power supply for a predetermined time delay interval to move said second contact out of engagement with said first contact; and (*f*) the resistance of said low resistance current path relative to the resistance of said high resistance current path being such that substantially the entire current of said receiver power supply flows through said low resistance current path while said switch means are closed.

2. The improvement in a remote control system as defined in claim 1 wherein said first current flow responsive means comprises a bimetal element which is heated by current flow to said receiver power supply, and said second current flow responsive means comprises a bimetal element which is heated by current flow in said high resistant-current path.

References Cited by the Examiner

UNITED STATES PATENTS

| | | | |
|---|---|---|---|
| 2,563,250 | 8/51 | Lacks | 250—20.42 |
| 2,674,701 | 4/54 | Maeritz | 307—141 |
| 2,930,955 | 3/60 | Bourget et al. | 250—20.41 |
| 3,052,848 | 9/62 | Marks | 325—392 |

DAVID G. REDINBAUGH, *Primary Examiner.*

SAMUEL B. PRITCHARD, *Examiner.*